(12) United States Patent
Brennecke et al.

(10) Patent No.: US 7,503,620 B2
(45) Date of Patent: Mar. 17, 2009

(54) STRUCTURAL REINFORCEMENT MEMBER AND METHOD OF USE THEREFOR

(75) Inventors: Eric Brennecke, Troy, MI (US); Gary Hulett, Memphis, MI (US)

(73) Assignee: Zephyros, Inc., Romeo, MI (US)

( * ) Notice: Subject to any disclaimer, the term of this patent is extended or adjusted under 35 U.S.C. 154(b) by 260 days.

(21) Appl. No.: 11/381,769

(22) Filed: May 5, 2006

(65) Prior Publication Data

US 2007/0090666 A1    Apr. 26, 2007

Related U.S. Application Data

(60) Provisional application No. 60/680,268, filed on May 12, 2005.

(51) Int. Cl.
*B60R 27/00* (2006.01)

(52) U.S. Cl. .......................... 296/187.02; 296/193.05; 296/193.06; 296/193.08; 296/146.5; 296/146.6

(58) Field of Classification Search ............ 296/187.02, 296/193.05, 193.06, 193.08, 146.5, 146.6
See application file for complete search history.

(56) References Cited

U.S. PATENT DOCUMENTS

| | | | |
|---|---|---|---|
| 2,192,075 A * | 2/1940 | Gregoire ................ 296/193.02 |
| 3,868,796 A | 3/1975 | Bush | |
| 4,463,870 A | 8/1984 | Coburn, Jr. et al. | |
| 4,610,836 A | 9/1986 | Wycech | |
| 4,751,249 A | 6/1988 | Wycech | |
| 4,769,391 A | 9/1988 | Wycech | |
| 4,769,951 A | 9/1988 | Kaaden | |
| 4,810,548 A | 3/1989 | Ligon, Sr. et al. | |
| 4,813,690 A | 3/1989 | Coburn, Jr. | |
| 4,822,011 A | 4/1989 | Goldbach et al. | |
| 4,836,516 A | 6/1989 | Wycech | |
| 4,853,270 A | 8/1989 | Wycech | |
| 4,861,097 A | 8/1989 | Wycech | |
| 4,923,902 A | 5/1990 | Wycech | |
| 4,978,562 A | 12/1990 | Wycech | |
| 5,124,186 A | 6/1992 | Wycech | |
| 5,344,208 A | 9/1994 | Bien et al. | |
| 5,358,397 A | 10/1994 | Ligon et al. | |
| 5,506,025 A | 4/1996 | Otto et al. | |
| 5,544,930 A | 8/1996 | Stedman | |
| 5,553,910 A | 9/1996 | Park | |
| 5,631,027 A | 5/1997 | Takabatake | |
| 5,642,914 A | 7/1997 | Takabatake | |
| 5,660,116 A | 8/1997 | Dannawi et al. | |
| 5,725,272 A | 3/1998 | Jones | |
| 5,755,486 A | 5/1998 | Wycech | |

(Continued)

FOREIGN PATENT DOCUMENTS

DE    198 12 288 C1    2/1998

(Continued)

OTHER PUBLICATIONS

Born et al., Structural Bonding in Automotive Applications.

(Continued)

*Primary Examiner*—Lori L Lyjak
(74) *Attorney, Agent, or Firm*—Dobrusin & Thennisch PC

(57) ABSTRACT

There is disclosed a reinforcement member with a carrier member and a reinforcement material disposed on the carrier member.

18 Claims, 3 Drawing Sheets

U.S. PATENT DOCUMENTS

| | | |
|---|---|---|
| 5,766,719 A | 6/1998 | Rimkus |
| 5,806,915 A | 9/1998 | Takabatake |
| 5,819,408 A | 10/1998 | Catlin |
| 5,851,626 A | 12/1998 | McCorry et al. |
| 5,888,600 A | 3/1999 | Wycech |
| 5,904,024 A | 5/1999 | Miwa |
| 5,985,435 A | 11/1999 | Czaplicki et al. |
| 5,992,923 A | 11/1999 | Wycech |
| 5,997,077 A | 12/1999 | Siebels et al. |
| 6,003,274 A | 12/1999 | Wycech |
| 6,006,484 A | 12/1999 | Geissbuhler |
| 6,033,300 A | 3/2000 | Schneider |
| 6,068,424 A | 5/2000 | Wycech |
| 6,079,180 A | 6/2000 | Wycech |
| 6,092,864 A | 7/2000 | Wycech et al. |
| 6,096,403 A | 8/2000 | Wycech et al. |
| 6,099,948 A | 8/2000 | Paver, Jr. |
| 6,103,341 A | 8/2000 | Barz et al. |
| 6,131,897 A | 10/2000 | Barz et al. |
| 6,135,541 A | 10/2000 | Geise et al. |
| 6,146,565 A | 11/2000 | Keller |
| 6,149,227 A | 11/2000 | Wycech |
| 6,150,428 A | 11/2000 | Hanley, IV et al. |
| 6,165,588 A | 12/2000 | Wycech |
| 6,168,226 B1 | 1/2001 | Wycech |
| 6,189,953 B1 | 2/2001 | Wycech |
| 6,196,621 B1 | 3/2001 | VanAssche |
| 6,199,940 B1 | 3/2001 | Hopton et al. |
| 6,203,096 B1 * | 3/2001 | Noda et al. .............. 296/146.6 |
| 6,207,244 B1 | 3/2001 | Hesch |
| 6,233,826 B1 | 5/2001 | Wycech |
| 6,237,304 B1 | 5/2001 | Wycech |
| 6,247,287 B1 | 6/2001 | Takabatake |
| 6,253,524 B1 | 7/2001 | Hopton et al. |
| 6,263,635 B1 | 7/2001 | Czaplicki |
| 6,270,600 B1 | 8/2001 | Wycech |
| 6,272,809 B1 | 8/2001 | Wycech |
| 6,276,105 B1 | 8/2001 | Wycech |
| 6,281,260 B1 | 8/2001 | Hanley, IV et al. |
| 6,287,666 B1 | 9/2001 | Wycech |
| 6,296,298 B1 | 10/2001 | Barz et al. |
| 6,305,136 B1 | 10/2001 | Hopton et al. |
| 6,311,452 B1 | 11/2001 | Barz et al. |
| 6,315,938 B1 | 11/2001 | Jandali |
| 6,319,964 B1 | 11/2001 | Blank et al. |
| 6,321,796 B1 | 11/2001 | Czaplicki et al. |
| 6,332,731 B1 | 12/2001 | Wycech |
| 6,341,467 B1 | 1/2002 | Wycech |
| 6,358,584 B1 | 3/2002 | Czaplicki |
| 6,368,438 B1 | 4/2002 | Chang et al. |
| 6,372,334 B1 | 4/2002 | Wycech |
| D457,120 S | 5/2002 | Broccardo et al. |
| 6,382,635 B1 | 5/2002 | Fitzgerald |
| 6,383,610 B1 | 5/2002 | Barz et al. |
| 6,389,775 B1 | 5/2002 | Steiner et al. |
| 6,406,078 B1 | 6/2002 | Wycech |
| 6,413,611 B1 | 7/2002 | Roberts et al. |
| 6,419,305 B1 | 7/2002 | Larsen |
| 6,422,575 B1 | 7/2002 | Czaplicki et al. |
| H2047 H | 9/2002 | Harrison et al. |
| 6,455,146 B1 | 9/2002 | Fitzgerald |
| 6,467,834 B1 | 10/2002 | Barz et al. |
| 6,471,285 B1 | 10/2002 | Czaplicki et al. |
| 6,474,722 B2 | 11/2002 | Barz |
| 6,474,723 B2 | 11/2002 | Czaplicki et al. |
| 6,475,577 B1 | 11/2002 | Hopton et al. |
| 6,478,367 B2 * | 11/2002 | Ishikawa .............. 296/203.03 |
| 6,482,486 B1 | 11/2002 | Czaplicki et al. |
| 6,482,496 B1 | 11/2002 | Wycech |
| 6,491,336 B1 | 12/2002 | Beckmann et al. |
| 6,502,821 B2 | 1/2003 | Schneider |
| 6,519,854 B2 | 2/2003 | Blank |
| 6,523,857 B1 | 2/2003 | Hopton et al. |
| 6,523,884 B2 | 2/2003 | Czaplicki et al. |
| 6,546,693 B2 | 4/2003 | Wycech |
| 6,550,847 B2 | 4/2003 | Honda et al. |
| 6,561,571 B1 | 5/2003 | Brennecke |
| 6,573,309 B1 | 6/2003 | Reitenbach et al. |
| 6,575,526 B2 * | 6/2003 | Czaplicki et al. ........ 296/187.02 |
| 6,585,202 B2 | 7/2003 | Broccardo et al. |
| 6,607,238 B2 | 8/2003 | Barz |
| 6,619,727 B1 | 9/2003 | Barz et al. |
| 6,634,698 B2 | 10/2003 | Kleino |
| 6,641,208 B2 | 11/2003 | Czaplicki et al. |
| 6,668,457 B1 | 12/2003 | Czaplicki |
| 6,679,540 B1 | 1/2004 | Graber et al. |
| 6,691,468 B2 | 2/2004 | Helferty |
| 6,692,347 B1 | 2/2004 | Schneider |
| 6,708,979 B2 | 3/2004 | Stratman et al. |
| 6,729,425 B2 | 5/2004 | Schneider |
| 6,748,667 B2 | 6/2004 | Sevastian |
| 6,777,049 B2 | 8/2004 | Sheldon et al. |
| 6,786,533 B2 | 9/2004 | Bock et al. |
| 6,793,274 B2 | 9/2004 | Riley et al. |
| 6,811,864 B2 | 11/2004 | Czaplicki et al. |
| 6,820,923 B1 | 11/2004 | Bock et al. |
| 6,846,559 B2 | 1/2005 | Czaplicki et al. |
| 6,851,232 B1 | 2/2005 | Schwegler |
| 6,855,652 B2 | 2/2005 | Hable et al. |
| 6,880,657 B2 | 4/2005 | Schneider et al. |
| 6,883,858 B2 * | 4/2005 | Barz ..................... 296/187.02 |
| 6,887,914 B2 | 5/2005 | Czaplicki et al. |
| 6,890,021 B2 | 5/2005 | Bock et al. |
| 6,905,745 B2 | 6/2005 | Sheldon et al. |
| 6,920,693 B2 | 7/2005 | Hankins et al. |
| 6,921,130 B2 | 7/2005 | Barz et al. |
| 6,923,499 B2 | 8/2005 | Wieber et al. |
| 6,928,736 B2 | 8/2005 | Czaplicki et al. |
| 6,932,421 B2 | 8/2005 | Barz |
| 6,938,947 B2 | 9/2005 | Barz et al. |
| 6,941,719 B2 | 9/2005 | Busseuil et al. |
| 6,953,219 B2 | 10/2005 | Lutz et al. |
| 6,955,593 B2 | 10/2005 | Lewis et al. |
| 6,969,551 B2 | 11/2005 | Richardson et al. |
| 7,004,536 B2 | 2/2006 | Wieber |
| 7,011,315 B2 | 3/2006 | Czaplicki et al. |
| 7,025,409 B2 | 4/2006 | Riley et al. |
| 7,041,193 B2 | 5/2006 | Bogert et al. |
| 7,077,460 B2 | 7/2006 | Czaplicki et al. |
| 7,160,491 B2 * | 1/2007 | Barz et al. .................. 264/46.6 |
| 7,255,388 B2 * | 8/2007 | Le Gall et al. ......... 296/187.02 |
| 2001/0022407 A1 | 9/2001 | Beckmann |
| 2002/0053179 A1 | 5/2002 | Wycech |
| 2002/0074827 A1 | 6/2002 | Fitzgerald et al. |
| 2002/0096833 A1 | 7/2002 | Czaplicki et al. |
| 2002/0174954 A1 | 11/2002 | Busseuil et al. |
| 2003/0001469 A1 | 1/2003 | Hankins et al. |
| 2003/0039792 A1 | 2/2003 | Hable et al. |
| 2003/0050352 A1 | 3/2003 | Guenther et al. |
| 2003/0057737 A1 | 3/2003 | Bock et al. |
| 2003/0062739 A1 | 4/2003 | Bock |
| 2003/0069335 A1 | 4/2003 | Czaplicki et al. |
| 2003/0140671 A1 | 7/2003 | Lande et al. |
| 2003/0176128 A1 | 9/2003 | Czaplicki et al. |
| 2003/0183317 A1 | 10/2003 | Czaplicki et al. |
| 2003/0184121 A1 | 10/2003 | Czaplicki et al. |
| 2003/0201572 A1 | 10/2003 | Coon et al. |
| 2003/0209921 A1 | 11/2003 | Coon et al. |
| 2003/0218019 A1 | 11/2003 | Le Gall et al. |
| 2004/0011282 A1 | 1/2004 | Myers et al. |
| 2004/0018341 A1 | 1/2004 | Richardson et al. |
| 2004/0018353 A1 | 1/2004 | Czaplicki et al. |
| 2004/0034982 A1 | 2/2004 | Wieber et al. |
| 2004/0036317 A1 | 2/2004 | Kleino |

| | | | | | | |
|---|---|---|---|---|---|---|
| 2004/0046423 | A1 | 3/2004 | Wieber | EP | 1 591 224 A1 | 2/2005 |
| 2004/0056472 | A1 | 3/2004 | Schneider | EP | 1 157 916 B1 | 10/2005 |
| 2004/0074150 | A1 | 4/2004 | Wycech | EP | 1 666 228 A2 | 6/2006 |
| 2004/0076831 | A1 | 4/2004 | Hable et al. | FR | 2749263 | 12/1997 |
| 2004/0079478 | A1 | 4/2004 | Merz | GB | 2 083 162 | 3/1982 |
| 2004/0084141 | A1 | 5/2004 | Czaplicki | GB | 2 375 328 | 11/2002 |
| 2004/0112531 | A1 | 6/2004 | Bogert et al. | JP | 59-214628 | 12/1984 |
| 2004/0124553 | A1 | 7/2004 | Czaplicki et al. | JP | 3-197743 | 8/1991 |
| 2004/0135058 | A1 | 7/2004 | Wycech | JP | 4-300715 | 10/1992 |
| 2004/0143969 | A1 | 7/2004 | Czaplicki | JP | 4-300716 | 10/1992 |
| 2004/0212220 | A1 | 10/2004 | Riley et al. | JP | 5-38992 | 2/1993 |
| 2004/0217626 | A1 | 11/2004 | Barz et al. | JP | 10-45031 | 2/1998 |
| 2004/0227377 | A1 | 11/2004 | Gray | JP | 10053156 | 2/1998 |
| 2004/0256888 | A1 | 12/2004 | Le Gall et al. | JP | 10-71628 | 3/1998 |
| 2004/0262810 | A1 | 12/2004 | Barz et al. | JP | 2000-52444 | 2/2000 |
| 2004/0262853 | A1 | 12/2004 | Larsen et al. | JP | 2001-48055 | 2/2001 |
| 2005/0012280 | A1 | 1/2005 | Richardson | JP | 2001-62833 | 3/2001 |
| 2005/0016807 | A1 | 1/2005 | Braymand | JP | 2001-199362 | 7/2001 |
| 2005/0017543 | A1 | 1/2005 | Riley et al. | JP | 02001191949 | 7/2001 |
| 2005/0081383 | A1 | 4/2005 | Kosal et al. | JP | 2002331960 | 11/2002 |
| 2005/0082111 | A1 | 4/2005 | Weber | JP | 2002-362412 | 12/2002 |
| 2005/0087899 | A1 | 4/2005 | Coon et al. | WO | WO 95/32110 | 5/1995 |
| 2005/0102815 | A1 | 5/2005 | Larsen | WO | WO 97/02967 | 1/1997 |
| 2005/0126286 | A1 | 6/2005 | Hable et al. | WO | WO 97/43501 | 11/1997 |
| 2005/0127145 | A1 | 6/2005 | Czaplicki et al. | WO | WO 98/50221 | 5/1998 |
| 2005/0159531 | A1 | 7/2005 | Ferng | WO | WO 99/08854 | 2/1999 |
| 2005/0166532 | A1 | 8/2005 | Barz | WO | WO99/17949 | 4/1999 |
| 2005/0172486 | A1 | 8/2005 | Carlson et al. | WO | WO 99/28575 | 6/1999 |
| 2005/0194706 | A1 | 9/2005 | Kosal et al. | WO | WO 99/48746 | 9/1999 |
| 2005/0212326 | A1 | 9/2005 | Marion | WO | WO 99/50057 | 10/1999 |
| 2005/0212332 | A1 | 9/2005 | Sheldon et al. | WO | WO00/03894 | 1/2000 |
| 2005/0217785 | A1 | 10/2005 | Hable et al. | WO | WO 00/13958 | 3/2000 |
| 2005/0218697 | A1 | 10/2005 | Barz et al. | WO | WO00/17000 | 3/2000 |
| 2005/0230165 | A1 | 10/2005 | Thomas et al. | WO | WO 00/37302 | 6/2000 |
| 2005/0241756 | A1 | 11/2005 | Harthcock et al. | WO | WO 00/40815 | 7/2000 |
| 2005/0249916 | A1 | 11/2005 | Muto et al. | WO | WO 00/43254 | 7/2000 |
| 2005/0251988 | A1 | 11/2005 | Mendiboure | WO | WO 00/46461 | 8/2000 |
| 2005/0260399 | A1 | 11/2005 | Finerman | WO | WO 00/55444 | 9/2000 |
| 2005/0268454 | A1 | 12/2005 | White | WO | WO01/19667 | 3/2001 |
| 2005/0269840 | A1 | 12/2005 | Finerman et al. | WO | WO 01/54936 | 8/2001 |
| 2005/0276970 | A1 | 12/2005 | Busseuil et al. | WO | WO 01/71225 | 9/2001 |
| 2005/0285292 | A1 | 12/2005 | Mendiboure et al. | WO | WO 01/83206 | 11/2001 |
| 2006/0000186 | A1 | 1/2006 | Carlson et al. | WO | WO 01/88033 | 11/2001 |
| 2006/0006695 | A1 | 1/2006 | Lutz et al. | WO | WO 03/042024 | 5/2003 |
| 2006/0008615 | A1 | 1/2006 | Muteau et al. | WO | WO 03/051676 | 6/2003 |
| 2006/0019595 | A1 | 1/2006 | Lewis et al. | WO | WO 03/93387 A1 | 11/2003 |
| 2006/0020076 | A1 | 1/2006 | Finerman et al. | WO | WO 2005/077634 A2 | 8/2005 |
| 2006/0021697 | A1 | 2/2006 | Riley et al. | WO | WO 2005/105405 | 11/2005 |
| 2006/0041227 | A1 | 2/2006 | Takabatake | WO | WO 2005/113689 | 12/2005 |
| 2006/0043772 | A1 | 3/2006 | Richardson | | | |
| 2006/0057333 | A1 | 3/2006 | Brahim | | | |
| 2006/0061115 | A1 | 3/2006 | Brennecke | | | |
| 2006/0065483 | A1 | 3/2006 | Thomas | | | |
| 2007/0018483 | A1* | 1/2007 | Kerscher et al. ....... 296/187.02 | | | |
| 2007/0080559 | A1* | 4/2007 | Stolarski et al. .......... 296/146.6 | | | |

OTHER PUBLICATIONS

Hopton et al., Application of a Structural Reinforcing Material to Improve Vehicle NVH Characteristics.
Lilley et al., Comparion of Preformed acoustic Baffles and Two-Component Polyurethane Foams for Filling Body Cavities.
Lilley et al., A Comparison of NVH Treatments for Vehicle Floorplan Applications.
Lilley et al., Vehicle Acoustic Solutions.
Mansour et al., Optimal Bonding Thickness for Vehicle Stiffness.
Klein et al., Application of Structural Foam in the Body in White.
Copending U.S. Appl. No. 10/718,509, filed Nov. 20, 2003.
Copending U.S. Appl. No. 10/806,309, filed Mar. 22, 2004.
Copending Patent Application Serial No. GB 0220945.0 filed Sep. 10, 2002.
Copending Patent Application Serial No. EP 0300159.1 filed Jan. 6, 2003.
Copending U.S. Appl. No. 10/920,520, filed Aug. 18, 2004.
Copending U.S. Appl. No. 10/941,553, filed Sep. 15, 2004.
Copending U.S. Appl. No. 10/973,050, filed Oct. 25, 2004.
Copending U.S. Appl. No. 10/967,783, filed Nov. 20, 2004.
Copending U.S. Appl. No. 60/675,581, filed Apr. 28, 2005.
Copending U.S. Appl. No. 60/676,406, filed Apr. 29, 2005.

FOREIGN PATENT DOCUMENTS

| DE | 198 56 255 C1 | 3/1998 |
|---|---|---|
| DE | 198 58 903 A1 | 12/1998 |
| EP | 0 611 778 | 1/1994 |
| EP | 0 891 918 A1 | 1/1999 |
| EP | 0 893 331 A1 | 1/1999 |
| EP | 0 893 332 A1 | 1/1999 |
| EP | 1 134 126 B1 | 3/2001 |
| EP | 1 122 156 A2 | 8/2001 |
| EP | 1 031 496 B1 | 12/2001 |
| EP | 0 893 332 B1 | 3/2002 |
| EP | 1 256 512 | 11/2002 |
| EP | 1 362 683 A2 | 11/2003 |
| EP | 1 362 769 A1 | 11/2003 |
| EP | 1 428 744 | 6/2004 |
| EP | 1 475 295 A2 | 11/2004 |

Copending U.S. Appl. No. 60/680,268, filed May 12, 2005.
Copending U.S. Appl. No. 60/688,255, filed Jun. 7, 2005.
Copending U.S. Appl. No. 11/188,679, filed Jul. 25, 2005.
Copending U.S. Appl. No. 11/189,190, filed Jul. 26, 2005.
Copending U.S. Appl. No. 60/709,947, filed Aug. 19, 2005.
Copending U.S. Appl. No. 60/711,101, filed Aug. 25, 2005.
Copending U.S. Appl. No. 60/720,867, filed Sep. 27, 2005.
Copending U.S. Appl. No. 11/254,129, filed Oct. 19, 2005.
Copending U.S. Appl. No. 60/729,820, filed Oct. 25, 2005.
Copending U.S. Appl. No. 60/729,821, filed Oct. 25, 2005.
Copending U.S. Appl. No. 60/740,766, filed Nov. 30, 2005.
Copending U.S. Appl. No. 60/753,973, filed Dec. 23, 2005.
Copending U.S. Appl. No. 11/339,431, filed Jan. 25, 2006.
Copending U.S. Appl. No. 60/771,713, filed Feb. 9, 2006.
Copending U.S. Appl. No. 11/390,658, filed Mar. 28, 2006.
Copending U.S. Appl. No. 11/391,884, filed Mar. 29, 2006.
Copending U.S. Appl. No. 11/393,535, filed Mar. 30, 2006.
Copending U.S. Appl. No. 11/393,431, filed Mar. 30, 2006.
Copending U.S. Appl. No. 11/401,207, filed Apr. 10, 2006.

* cited by examiner

STRUCTURAL REINFORCEMENT MEMBER AND METHOD OF USE THEREFOR

CLAIM OF PRIORITY

This application claims the benefit of the filing date of U.S. Provisional Application No. 60/680,268 filed May 12, 2005.

FIELD OF THE INVENTION

The present invention relates generally to a structural reinforcement member and its use in reinforcing a structure of an automotive vehicle or other article of manufacture.

BACKGROUND OF THE INVENTION

For many years, industry and particularly the transportation industry has been concerned with designing structural reinforcement members for articles of manufacture such as automotive vehicles. For example, U.S. Pat. Nos. 5,755,486; 4,901,500; and 4,751,249 describe prior art reinforcing devices. Design of such reinforcement members can involve a number of competing factors. For example, it can be difficult to provide adequate or desirable reinforcement while maintaining lower weights for the reinforcement members. In turn, it can become quite desirable to bolster or enhance the strength of such reinforcement members without significantly adding to the weight of such reinforcement members. Thus, the present invention seeks to provide an improved structural reinforcement member with added strength characteristics, relatively low weight and/or other desirable characteristics.

SUMMARY OF THE INVENTION

Accordingly, a structural reinforcement member is provided. The structural reinforcement member includes a carrier member having a plurality of ribs and a plurality of masses of expandable material disposed between the plurality of ribs. The plurality of masses of expandable material are typically configured to expand upon exposure to an elevated temperature to form a reinforcing foam that preferably has a compression strength of at least about 10MPa.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF THE PREFERRED EMBODIMENT

The present invention is predicated upon the provision a structural reinforcement member and its use in forming a structural reinforcement system within an article of manufacture. The structural reinforcement member has been found to be particularly useful for reinforcing portions of automotive vehicles, however, it is contemplated that the member may be employed in a variety of articles of manufacture such as buildings, furniture, watercraft or the like.

Typically, a structural reinforcement member according to the present invention will include a carrier member with a reinforcement material disposed thereon. It is also contemplated, however, that the carrier member may be utilized without the reinforcement material or the carrier member may be formed of the reinforcement material. The reinforcement member is typically configured to be located within a cavity defined by a structure of the automotive vehicle, although not required.

According to one preferred embodiment the carrier member is elongated and includes a plurality of ribs disposed along the length of the carrier member. In the embodiment, the reinforcement material is typically an expandable material that is at least partially positioned between the ribs of the carrier member. Upon expansion, the reinforcement material can typically provide an added amount of strength to the reinforcement member.

Figure 1:
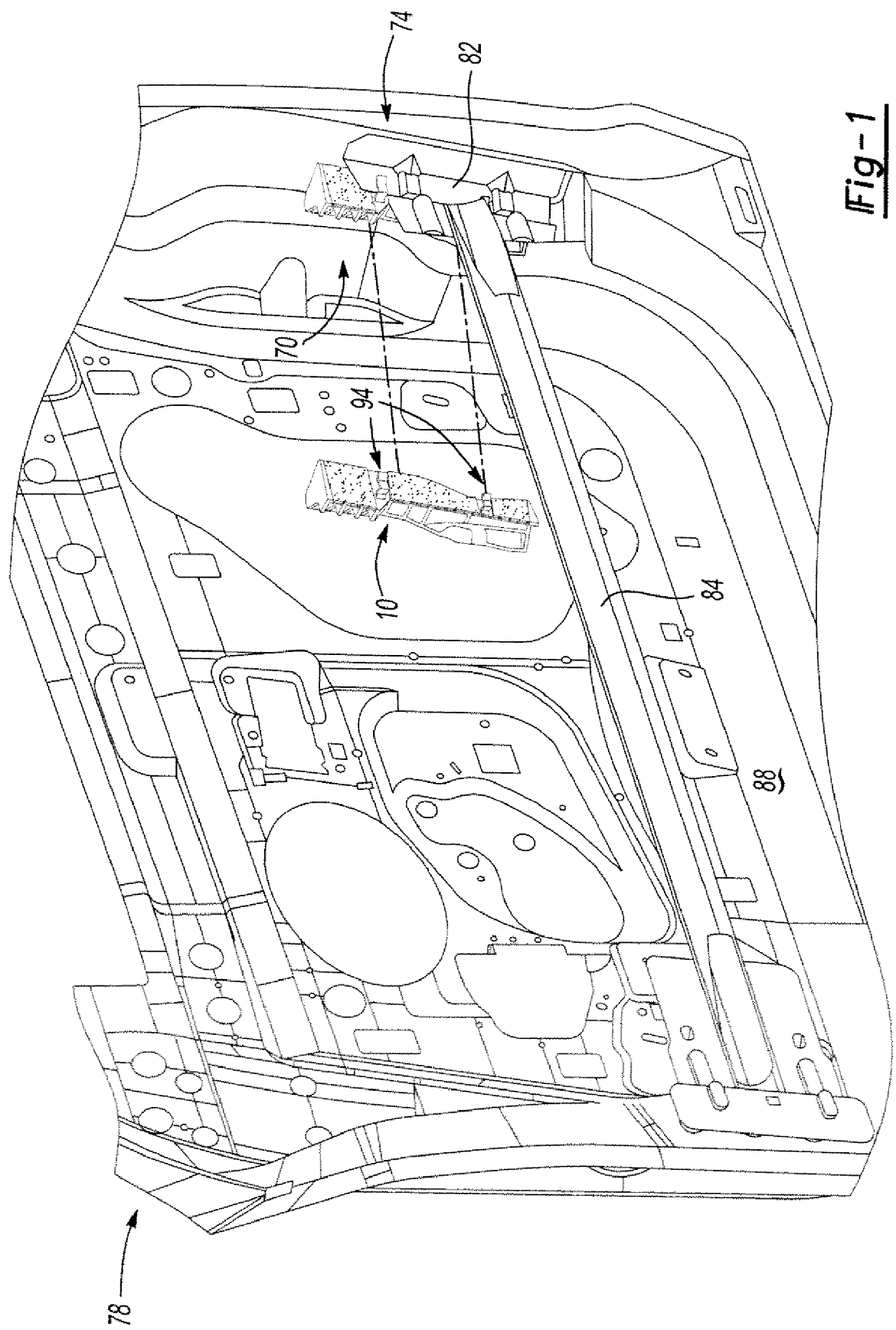
FIG. 1 is a perspective view of a structural reinforcement member according to a preferred aspect of the present invention.
Figure 2:
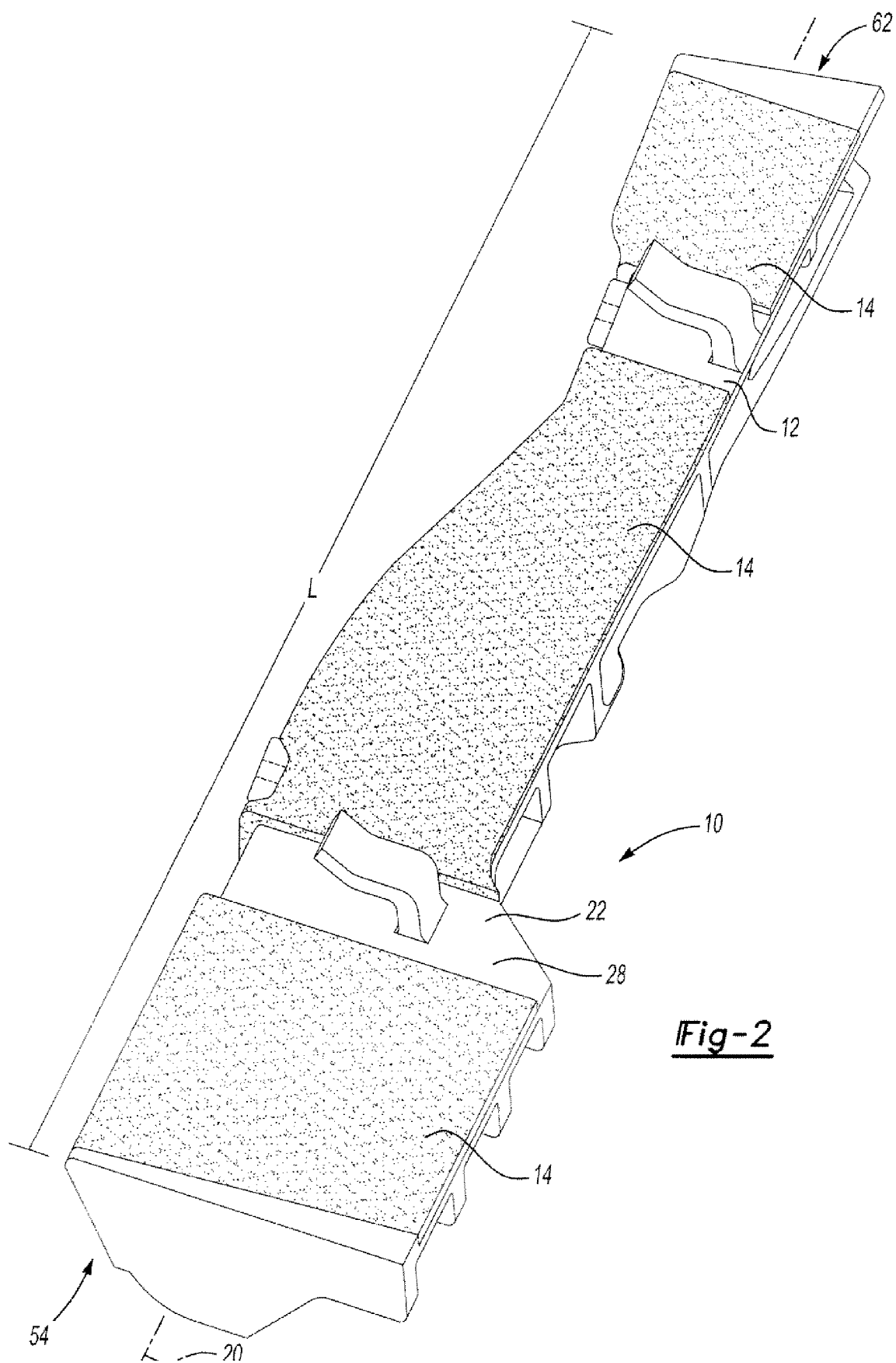
FIG. 2 is another perspective view of the structural reinforcement member of FIG. 1.

FIGS. 1 and 2 illustrate an example of a structural reinforcement member 10, which is configured for placement within a cavity of a structure of an automotive vehicle for forming a reinforced structural system along with the structure of the vehicle. Preferably, the structure of the vehicle at least partially defines the cavity. As will be appreciated, the member 10 may be suited for placement in a variety of cavities or in a variety of other locations for reinforcing a variety of structures of the automotive vehicle or other article of manufacture.

The reinforcement member 10 includes a carrier member 12 and one or more masses 14, 16, 18 of reinforcement material disposed upon the carrier member 12. The illustrated carrier member 12 is generally elongated and has a length (L) that substantially extends along an axis 20. In the embodiment shown, the length of the carrier member 12 is substantially greater than (e.g., at least 40%, 70%, 100% or more greater than) any diameter of any cross-section of the carrier member 12 taken perpendicular to the length (L).

Generally, it is contemplated that the carrier member 12 may be shaped in a variety of configurations depending upon the structure to which the reinforcement member 10 is to be applied. In the illustrated embodiment, the carrier member 12 includes a first wall 22 and a second wall 24, which are shown as adjoining each other.

The first wall 22 is shown as being substantially planar in directions of a single plane. The second wall 24 is more contoured and extends in directions of multiple planes. It should be noted, however, that at least one plane and preferably multiple or all of the planes in which the second wall 24 extend are substantially continuously skew (e.g., perpendicular) to the at least one plane and preferably multiple or all of the planes in which the first wall 22 extend.

Each of the walls 22, 24 respectively includes an external outwardly facing surface 28, 30 that typically extends in the same planes as its respective wall. Each of the wall 22, 24 respectively includes and internal inwardly facing surface 32, 34. Generally, the carrier member 12 and more particularly the walls 22, 24, the inwardly facing surfaces 32, 34 or both define a concavity 36 that extends along a substantial portion (e.g., 50%, 70%, 90% or greater) of the length (L) of the carrier member 12.

The carrier member 12 is also illustrated as having a plurality of ribs 44, 46, 48, 50. In the embodiment illustrated, all of the ribs 44, 46, 48 and 50 are located at least partially or more typically substantially entirely within the concavity 36 of the carrier member 12 dividing the concavity into a plurality of cavities 54, 56, 58. However, it is contemplated that ribs may be formed or located substantially external of the concavity 36.

At a first end 54 of the carrier member 12, there is a first set of multiple (e.g., 2, 3, 4 or more) ribs 44 spaced apart along the length (L) of the carrier member 12. Each of the ribs 44 of the first set is substantially similar and includes an indentation that corresponds at least partially to the shape of the concavity 36. As can be seen the first set of ribs 44 divides the concavity 36 into a first set of multiple (e.g., 2, 3 or more) cavities 54. Each of the cavities 54 has a volume defined by the space between opposing surfaces of the ribs 44.

More centrally located along the length (L) of the carrier member 12 is a second set of multiple (e.g., 2, 3, 4 or more) ribs 46 spaced apart along the length (L) of the carrier member 12. Each of the ribs 46 of the second set is substantially similar and protrudes at least slightly away from the first and second walls 22, 24. As can be seen the second set of ribs 46, possibly in conjunction with one rib 44 of the first set of ribs 44, divides the concavity 36 into a second set of multiple (e.g., 2, 3 or more) cavities 56. Each of the cavities 56 has a volume defined by the space between opposing surfaces of the ribs 46. Moreover, one of the cavities 56 is divided into sub-cavities 60 by a ribs that is substantially perpendicular to the second and first sets of ribs 44, 46.

At a second end 62 of the carrier member 12 opposite the first end 54 of the carrier member 12, there is a third set of multiple (e.g., 2, 3, 4 or more) ribs 48 spaced apart along the length (L) of the carrier member 12. As can be seen the third set of ribs 48 divides the concavity 36 into a third set of multiple (e.g., 2, 3 or more) cavities 64. Each of the cavities 64 has a volume defined by the space between opposing surfaces of the ribs 48.

The carrier member or at least portions thereof could be formed of polymeric material materials (e.g., injection molded nylon, injection molded plastic, extruded polymeric materials, combinations thereof or the like), or molded, extruded or otherwise-shaped metal (such as aluminum, magnesium, steel and titanium, an alloy derived from the metals, and even a metallic foam). The carrier member may also be formed of a molding compound such as a sheet molding compound (SMC), a bulk molding compound (BMC), a thick molding compound (TMC) or the like. The formation of carrier members from molding compound is discussed in U.S. patent application Ser. No. 10/712,069, filed Nov. 13, 2003, which is incorporated herein by reference for all purposes.

The masses 14, 16, 18 of reinforcement or expandable material may be located in various locations relative to the carrier member 12. The masses 14, 16, 18 may interconnect with each other such that the masses 14, 16, 18 are continuous with each other or they may be spatially separated from each other.

In the embodiment shown, at least one mass 14 of reinforcement material covers a substantial portion (e.g., at least 40%, 60%, 80% or more) of the external surface 28 of the first wall 22. Also, as shown, the at least one mass 14 of reinforcement material covers a substantial portion (e.g., at least 40%, 60%, 80% or more) of the external surface 30 of the second wall 24.

Additionally, multiple masses 16, 18 are respectively located in the cavities 54, 56 between the ribs 44, 46 of the first set and the second set of ribs. The masses 16, 18 preferably occupy an amount of the volume of the cavities 54, 56 that is less than about 90%, more typically less than about 70% and even more typically less than about 50% of the respective volumes of the cavities 54, 56 particularly prior to expansion of the masses 16, 18 of expandable material. It is also noted that one of the masses 18 of expandable material is located in one of the sub-cavities 60, while the other sub-cavity 60 is substantially devoid of expandable or reinforcement material.

For assisting in locating the reinforcement material in the cavities 54, 56, openings (e.g., through-holes) can extend through the carrier member 12. As an example, on or more through-holes could extend from the first wall 22 to the second wall 24 such that reinforcement material 14 that is being located (e.g., overmolded) onto the first wall 22 can at least partially be fed through the through holes to become reinforcement material 16 or 18 in the cavities 54, 56.

The reinforcement material may be formed of several different materials. Generally speaking, the present invention may utilize technology and processes for forming and applying the reinforcement material such as those disclosed in U.S. Pat. Nos. 4,922,596, 4,978,562, 5,124,186, and 5,884,960 and commonly owned, co-pending U.S. application Ser. No. 09/502,686 filed Feb. 11, 2000 and Ser. No. 09/524,961 filed Mar. 14, 2000, all of which are expressly incorporated by reference for all purposes. Preferably, the reinforcement material is formed of a high compressive strength and stiffness heat activated reinforcement material having foamable characteristics. The material may be generally dry and non-tacky to the touch or tacky and can be placed upon a carrier member or the like in any form of desired pattern, placement, or thickness, but is preferably of substantially uniform thickness. One exemplary reinforcement material is L-5218 structural foam available through L&L Products, Inc. of Romeo, Mich.

Though other heat-activated materials are possible for the reinforcement material, a preferred heat activated material is an expandable polymer or plastic, and preferably one that is foamable with adhesive characteristics. A particularly preferred material is an epoxy-based structural foam. For example, and without limitation, the structural foam may be an epoxy-based material, including an ethylene copolymer or terpolymer that may possess an alpha-olefin. As a copolymer or terpolymer, the polymer is composed of two or three different monomers, i.e., small molecules with high chemical reactivity that are capable of linking up with similar molecules.

A number of epoxy-based structural reinforcing or sealing foams are known in the art and may also be used to produce the structural foam. A typical structural foam includes a polymeric base material, such as an epoxy resin or ethylene-based polymer which, when compounded with appropriate ingredients (typically a blowing and curing agent), expands and cures in a reliable and predictable manner upon the application of heat or the occurrence of a particular ambient condition. From a chemical standpoint for a thermally-activated material, the structural foam is usually initially processed as a flowable thermoplastic material before curing. It will cross-link or thermoset upon curing, which makes the material incapable of further flow (e.g., become thermoset).

Examples of preferred structural foam formulations are epoxy-based materials that are commercially available from L&L Products of Romeo, Mich., under the designations L5206, L5207, L5208, L-5248, L5218. One advantage of the preferred structural foam materials over prior art materials is that the preferred materials can be processed in several ways. The preferred materials can be processed by injection molding, extrusion compression molding or with a mini-applicator. This enables the formation and creation of part designs that exceed the capability of most prior art materials. In one preferred embodiment, the structural foam (in its uncured state) generally is dry or relatively free of tack to the touch and can easily be attached to the carrier member through fastening means or adhesion.

While the preferred materials for fabricating the reinforcement material have been disclosed, the reinforcement material can be formed of other materials provided that the material selected is heat-activated or otherwise activated by an ambient condition (e.g. moisture, pressure, time or the like) and cures in a predictable and reliable manner under appropriate conditions for the selected application. One such material is the epoxy based resin disclosed in U.S. Pat. No. 6,131,897, the teachings of which are incorporated herein by reference, filed with the United States Patent and Trademark Office on Mar. 8, 1999 by the assignee of this application. Some other possible materials include, but are not limited to, polyolefin materials, copolymers and terpolymers with at least one monomer type an alpha-olefin, phenol/formaldehyde materials, phenoxy materials, and polyurethane materials with high glass transition temperatures. See also, U.S. Pat. Nos. 5,766,719; 5,755,486; 5,575,526; and 5,932,680, (incorporated by reference). In general, the desired characteristics of the reinforcement material 30 include relatively high stiffness, high strength, high glass transition temperature (typically greater than 70 degrees Celsius), and adhesion durability properties. In this manner, the material does not generally interfere with the materials systems employed by automobile manufacturers. Exemplary materials include materials sold under product designation L5207, L-5248 and L5208, which are commercially available from L & L Products, Romeo, Mich.

In applications where the reinforcement material is a heat activated, thermally expanding material, an important consideration involved with the selection and formulation of the material comprising the structural foam is the temperature at which a material reaction or expansion, and possibly curing, will take place. For instance, in most applications, it is undesirable for the material to be reactive at room temperature or otherwise at the ambient temperature in a production line environment. More typically, the structural foam becomes reactive at higher processing temperatures, such as those encountered in an automobile assembly plant, when the foam is processed along with the automobile components at elevated temperatures or at higher applied energy levels, e.g., during paint, primer or e-coat curing or baking steps. While temperatures encountered in an automobile assembly operation may be in the range of about 148.89° C. to 204.44° C. (about 300° F. to 400° F.), body and paint shop applications are commonly about 93.33° C. (about 200° F.) or slightly higher. If needed, blowing agent activators can be incorporated into the composition to cause expansion at different temperatures outside the above ranges.

Generally, suitable expandable foams have a range of expansion ranging from approximately 0 to 10 to 300 to over 1000 or greater percent relative to their original non-expanded sizes. The level of expansion of the reinforcement material may be increased to as high as 1500 percent or more. Typically, strength and stiffness are obtained from products that possess lower expansion characteristics.

Some other possible materials for the reinforcement material include, but are not limited to, polyolefin materials, copolymers and terpolymers with at least one monomer type an alpha-olefin, phenolformaldehyde materials, phenoxy materials, and polyurethane. See also, U.S. Pat. Nos. 5,266,133; 5,766,719; 5,755,486; 5,575,526; 5,932,680; and WO 00/27920 (PCT/US 99/24795) (all of which are expressly incorporated by reference). In general, the desired characteristics of the resulting material include transition point, and good adhesion durability properties. In this manner, the material does not generally interfere with the materials systems employed by automobile manufacturers. Moreover, it will withstand the processing conditions typically encountered in the manufacture of a vehicle, such as the e-coat priming, cleaning and degreasing and other coating processes, as well as the painting operations encountered in final vehicle assembly.

In another embodiment, the reinforcement material is provided in an encapsulated or partially encapsulated form, which may comprise a pellet, which includes an expandable foamable material, encapsulated or partially encapsulated in an adhesive shell. An example of one such system is disclosed in commonly owned, co-pending U.S. application Ser. No. 09/524,298("Expandable Pre-Formed Plug"), hereby incorporated by reference.

In addition, as discussed previously, preformed patterns may also be employed such as those made by extruding a sheet (having a flat or contoured surface) and then die cutting it according to a predetermined configuration in accordance with the chosen pillar structure, door beam, carrier member or the like, and applying it to thereto.

It is contemplated that the material of the reinforcement material could be delivered and placed into contact with the assembly members, through a variety of delivery systems which include, but are not limited to, a mechanical snap fit assembly, extrusion techniques commonly known in the art as well as a mini-applicator technique as in accordance with the teachings of commonly owned U.S. Pat. No. 5,358,397 ("Apparatus For Extruding Flowable Materials"), hereby expressly incorporated by reference. In this non-limiting embodiment, the material or medium is at least partially coated with an active polymer having damping characteristics or other heat activated polymer, (e.g., a formable hot melt adhesive based polymer or an expandable structural foam, examples of which include olefinic polymers, vinyl polymers, thermoplastic rubber-containing polymers, epoxies, urethanes or the like) wherein the foamable or reinforcement material can be snap-fit onto the chosen surface or substrate; placed into beads or pellets for placement along the chosen substrate or member by means of extrusion or injection molding; placed along the substrate through the use of baffle technology; a die-cast application according to teachings that are well known in the art; pumpable application systems which could include the use of a baffle and bladder system; and sprayable applications.

In still another embodiment, it is contemplated that the reinforcement material may be applied to the carrier member while the carrier member is at an elevated temperature. As such the reinforcement material will adhere to the carrier member as described in U.S. Provisional Patent Application Ser. No. 60/443,108, already incorporated by reference.

In preferred embodiments, it is desirable for the reinforcement material to have a relatively high post-expansion compressive strength. In such embodiments, the reinforcement material will typically have a post-expansion compressive strength of greater than about 5 MPa, more typically greater than about 10 MPa and even more typically greater than about 13 MPa, although not required, It may also be desirable for the reinforcement material to have a relatively low post-expansion density in comparison to other reinforcing foams or other reinforcing materials. In such an embodiment, the reinforcement material will typically have a post-expansion density of no greater than about 1.5 g/cm$^3$, more typically no greater than about 0.8 g/cm$^3$ and even more typically no greater than about 0.6 g/cm$^3$, although not required.

Formation

As discussed, the reinforcement material can be processed in a number of different ways. As such, the reinforcement material may be applied to the carrier member using a variety of techniques. In one exemplary preferred embodiment, the carrier member is placed as an insert into a mold of an injection molding machine and the reinforcement material is insert injection molded into place (e.g., onto the surfaces 28, 30, 32, 34 and into the cavities 54, 56) such that it adheres to the carrier member. In another preferred exemplary embodiment, the member reinforcement is two shot injection molded by injection a first shot of material to form the carrier member and injection molding a second shot of material to form and/or apply the reinforcement material and position the reinforcement material relative to the carrier member (e.g., onto the surfaces 28, 30, 32, 34 and into the cavities 54, 56)

Application

Generally, the reinforcement member is applied to a structure of an article of manufacture (e.g., a transportation vehicle or automotive vehicle) for forming a reinforced structural system. During formation of the reinforced structural system, the reinforcing structural member can be placed within a cavity of or adjacent to a structure of an automotive vehicle and the structure may be defined by one or more components of the automotive vehicle.

Exemplary structures of an automotive vehicle that define a cavity suitable for receipt of a reinforcement member of the present invention include, without limitation, vehicle pillars (e.g., A, B, C or D Pillars), frame members, body members, roof rails, vehicle doors, bumpers, wheel wells, combinations thereof or the like. Each of the structures can form a reinforced structural system in conjunction with the reinforcement member.

Figure 3:
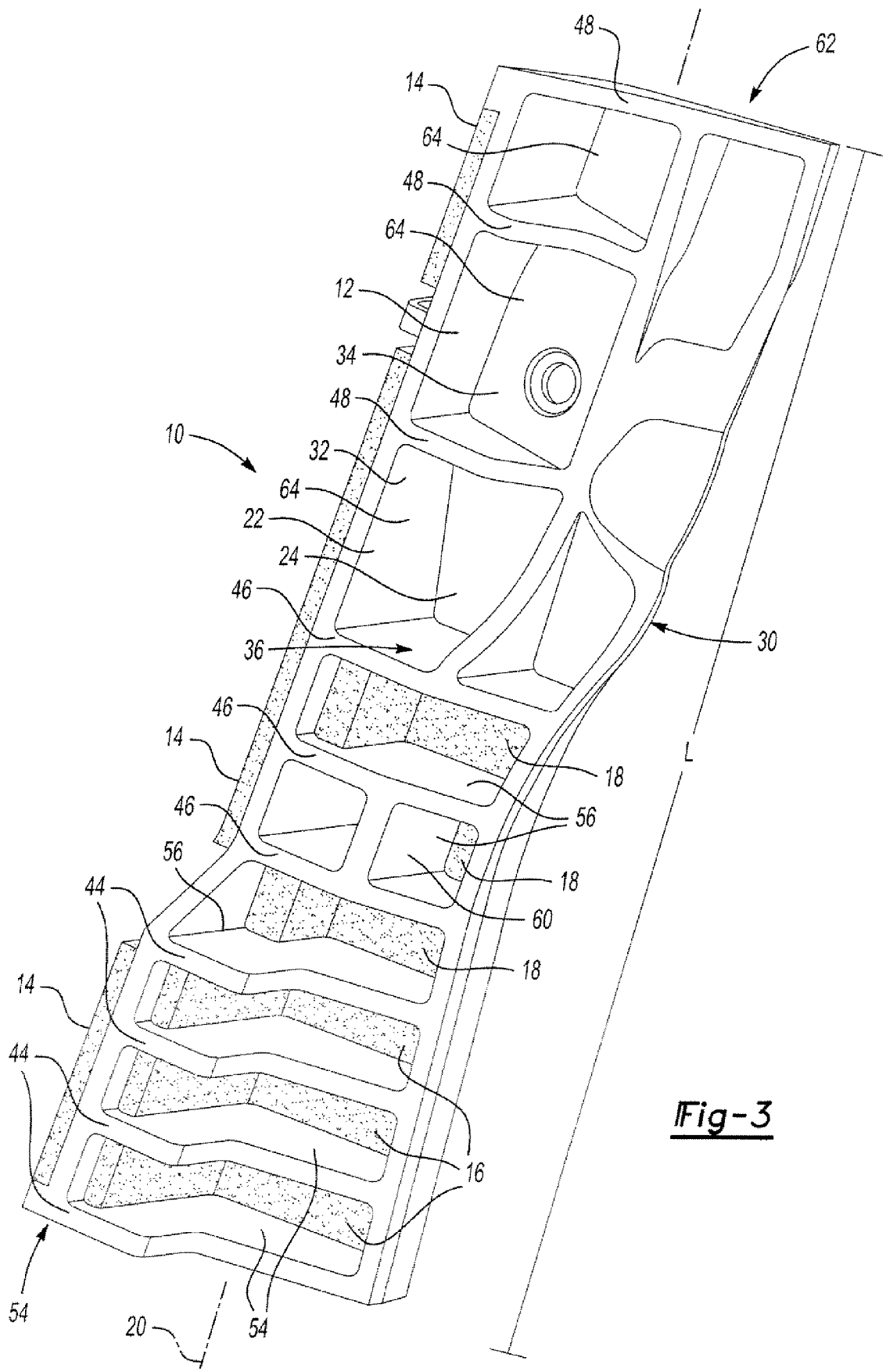
FIG. 3 is a perspective view of the structural reinforcement member of FIGS. 1 and 2 being applied to an automotive vehicle.

In the exemplary embodiment shown in FIG. 3, the member 10 is placed within a cavity 70 defined by walls 72 of a structure 74 formed by one or more components of a door 78 of an automotive vehicle. In the particular embodiment illustrated, the components include an end attachment 82 of a vehicle door reinforcement beam 84 and an inner panel 88 of the door 78 of the automotive vehicle.

It should be noted that various fasteners or adhesive may be used to at least temporarily hold the reinforcement member in place until the reinforcement material is activated. For example, the exemplary member 10 illustrated includes a pair of fasteners shown as clips 94 which are interference fit to the end attachment 82 for holding the reinforcement member 10 in place at least temporarily.

After desired placement of the reinforcement member, the reinforcement material is activated (e.g., expanded and/or cured using heat experienced during an e-coat process or other painting, priming or coating operation typically encountered in the production of automotive vehicles), such that the reinforcement material, expands, contacts and adheres to the walls or surfaces of the components adjacent the materials.

Once the reinforcement material is substantially fully expanded and cured, the reinforcement member reinforces the components and/or other members (e.g., frame members, trunk compartment rails, body members or panels, pillars or the like) of the vehicle thereby forming a reinforced system. Advantageously, the expanded or foamed reinforcement material 16, 18 in between the ribs 44, 46 can provide an added degree of strength and reinforcement to the carrier member and/or the structure to be reinforced. Preferably, upon expansion (e.g., foaming), the masses 16, 18 of reinforcement material substantially fill (e.g., fill at least 60%, 85%, 95% or more) or entirely fill the cavities 54, 56 or sub-cavity 60 between the ribs 44, 46, although not necessarily required.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. A structural reinforcement member, comprising:
   a carrier member having three sets of ribs;
   a plurality of masses of expandable material disposed between the three sets of ribs, wherein:
   i. the plurality of masses of expandable material expand upon exposure to an elevated temperature to form a reinforcing foam having a compression strength of at least about 10 MPa; and
   ii. the plurality of masses of expandable material are disposed between the three sets of ribs through an opening located on the exterior of the carrier.

2. A structural reinforcement member as in claim 1 wherein the carrier member includes a first wall having an external outwardly facing surface and a second wall having an external outwardly facing surface, the second wall being generally skew to the first wall.

3. A structural reinforcement member as in claim 2 wherein each rib of the three sets of ribs extends between and adjoins the first wall and the second wall.

4. A structural reinforcement member as in claim 2 wherein expandable material is disposed upon an external surface of the first wall and an external surface of the second wall.

5. A structural reinforcement member as in claim 1 wherein fasteners attach the member to a door of a vehicle between one or more walls of the door.

6. A structural reinforcement member as in claim 5 wherein the one or more walls are defined by a vehicle door reinforcement beam and an inner panel of the door.

7. A structural reinforcement member as in claim 1 wherein the reinforcing foam occupies greater than 80% of the volume of each of the cavities.

8. A structural reinforcement member as in claim 1 wherein the ribs are aligned along a length of the carrier member.

9. A structural reinforcement member, comprising:
   a carrier member having a first wall and a second wall and a length extending along an axis, the carrier member including:
   i. a plurality of substantially planar ribs cooperatively forming a plurality of cavities aligned along the length of the carrier member, the plurality of ribs extending substantially perpendicular to the axis of the carrier member; and ii. a concavity defined by the first wall and the second wall wherein the plurality of ribs are located substantially entirely within the concavity, wherein at least one of the plurality of ribs includes an indentation that corresponds at least partially to the shape of the concavity:

a plurality of masses of expandable material respectively disposed within the plurality of cavities between the plurality of ribs, wherein:

i. the plurality of masses of expandable material expand upon exposure to an elevated temperature to form a plurality of masses of reinforcing foam, which having a compression strength of at least about 13 MPa.

10. A structural reinforcement member as in claim 9 wherein each rib of the plurality of ribs extends between and adjoins the first wall and the second wall.

11. A structural reinforcement member as in claim 9 wherein expandable material is disposed upon an external surface of the first wall and an external surface of the second wall.

12. A structural reinforcement member as in claim 9 wherein the cavities each have a volume and the plurality of masses of expandable material respectively occupy no more than 70% of the volume of each of the cavities.

13. A structural reinforcement member as in claim 9 wherein fasteners attach the member to a door of a vehicle between one or more walls of the door.

14. A structural reinforcement member as in claim 13 wherein the one or more walls are defined by a vehicle door reinforcement beam and an inner panel of the door.

15. A structural reinforcement member as in claim 9 wherein the reinforcing foam occupies greater than 80% of the volume of each of the cavities.

16. A structural reinforcement member, comprising:
a carrier member having a length extending along an axis, the carrier member including:
i. a first substantially planar wall having an external outwardly facing surface, the first wall being substantially planar in a first plane;
ii. a second substantially planar wall having an external outwardly facing surface, the second wall being substantially planar in a second plane, the first wall adjoining the second wall, the second plane being skew to the first plane;
iii. three sets of substantially planar ribs extending between and adjoining the first wall and the second wall and cooperatively forming a plurality of cavities aligned along the length of the carrier member, the plurality of ribs being substantially planar in planes extending substantially perpendicular to the axis of the carrier member, wherein a first set of the substantially planar ribs includes only ribs that are perpendicular to the first wall and a second set and a third set of the substantially planar ribs include ribs that are perpendicular to the first wall and ribs that are parallel to the first wall;
iv. a concavity defined by the first wall and the second wall wherein the three sets of ribs are located substantially entirely within the concavity, wherein each of the first set of ribs includes an indentation that corresponds at least partially to the shape shape of the concavity; and
v. at least one through-hole so that material can move from the exterior of the first wall or second wall into the concavity;

a plurality of masses of expandable material respectively disposed within the plurality of cavities between the plurality of ribs, wherein:

i. the cavities each have a volume and the plurality of masses of expandable material respectively occupy no more than 70% of the volume of each of the cavities;
ii. the plurality of masses of expandable material expand upon exposure to an elevated temperature to form a plurality of masses of reinforcing foam, which having a compression strength of at least about 13 MPa and which occupy greater than 80% of the volume of each of the cavities; and
iii. the expandable material being located onto the first or second wall can at least partially be fed through the at least one through-hole into the cavities.

17. A structural reinforcement member as in claim 16 wherein fasteners attach the member to a door of a vehicle between one or more walls of the door.

18. A structural reinforcement member as in claim 17 wherein the one or more walls are defined by a vehicle door reinforcement beam and an inner panel of the door.

* * * * *